US008985774B2

(12) United States Patent  
Maekawa

(10) Patent No.: US 8,985,774 B2  
(45) Date of Patent: Mar. 24, 2015

(54) FLOATING IMAGE INTERACTION DEVICE AND ITS PROGRAM

(75) Inventor: Satoshi Maekawa, Tokyo (JP)

(73) Assignee: National Institute of Information and Communication Technology, Tokyo (JP)

( * ) Notice: Subject to any disclaimer, the term of this patent is extended or adjusted under 35 U.S.C. 154(b) by 1066 days.

(21) Appl. No.: 12/593,977

(22) PCT Filed: Mar. 31, 2008

(86) PCT No.: PCT/JP2008/056349

§ 371 (c)(1),
(2), (4) Date: Sep. 30, 2009

(87) PCT Pub. No.: WO2008/123500

PCT Pub. Date: Oct. 16, 2008

(65) Prior Publication Data

US 2010/0110384 A1    May 6, 2010

(30) Foreign Application Priority Data

Mar. 30, 2007   (JP) ................................ 2007-091786

(51) Int. Cl.
| | |
|---|---|
| *G03B 21/00* | (2006.01) |
| *G06F 3/03* | (2006.01) |
| *G02B 5/124* | (2006.01) |
| *G02B 5/136* | (2006.01) |
| *G02B 27/22* | (2006.01) |
| *G03B 15/00* | (2006.01) |

(Continued)

(52) U.S. Cl.
CPC .............. *G06F 3/0304* (2013.01); *G02B 5/124* (2013.01); *G02B 5/136* (2013.01); *G02B 27/2292* (2013.01); *G03B 15/00* (2013.01); *G03B 35/18* (2013.01); *G06F 3/011* (2013.01); *G06F 3/016* (2013.01); *G06F 3/017* (2013.01)
USPC ......................................................... 353/10

(58) Field of Classification Search
USPC .......... 353/7, 10; 359/727, 627; 356/435, 432
See application file for complete search history.

(56) References Cited

U.S. PATENT DOCUMENTS 3,057,256 A * 10/1962 Erban ........................... 359/456
6,819,507 B2 * 11/2004 Minoura et al. ............... 359/727

(Continued)

FOREIGN PATENT DOCUMENTS

| EP | 1909255 A1 * | 4/2008 |
|---|---|---|
| JP | 10-326148 A | 12/1998 |

(Continued)

OTHER PUBLICATIONS

International Search Report of PCT/JP2008/056349, with a mailing date of Jul. 8, 2008.

(Continued)

*Primary Examiner* — Sultan Chowdhury  
*Assistant Examiner* — Danell L Owens  
(74) *Attorney, Agent, or Firm* — Westerman, Hattori, Daniels & Adrian, LLP

(57) ABSTRACT

A floating image interaction device includes an imaging optical system projecting a floating real image of an object and an user object detecting means for obtaining information about the user accessing the floating real image; means to realize interactive response by the real image or by haptic feedback to actions by the user; and related computer programs.

20 Claims, 15 Drawing Sheets

(51) Int. Cl.
*G03B 35/18* (2006.01)
*G06F 3/01* (2006.01)

(56) References Cited

U.S. PATENT DOCUMENTS

2001/0043719 A1 11/2001 Karakawa et al.
2002/0015153 A1* 2/2002 Downs .................. 356/450

FOREIGN PATENT DOCUMENTS

| JP | 2001-022499 | A | | 1/2001 |
| JP | 2001022499 | A | * | 1/2001 |
| JP | 2004-213351 | A | | 7/2004 |
| JP | 2004213351 | A | * | 7/2004 |
| JP | 2005141102 | A | * | 6/2005 |
| WO | 2007/013215 | A1 | | 2/2007 |
| WO | 2007-013215 | A1 | | 2/2007 |

OTHER PUBLICATIONS

Chinese Office Action dated Aug. 31, 2010, issued in corresponding Chinese Patent Applicaton No. 200880009804.0.

Japanese Office Action dated May 24, 2012, issued in corresponding Japanese Patent Application No. 2009-509249, with English translation (6 pages).

* cited by examiner (a)

(b)

(a)

(b)

FLOATING IMAGE INTERACTION DEVICE AND ITS PROGRAM

FIELD OF THE INVENTION

The present invention is related to an interactive floating imaging device, that is, to an optical device that allows interaction between floating real images and users, and also to programs utilizing such interactions.

BACKGROUND OF THE INVENTION

Recently, newly developed technology made it possible for users (observers) to access images projected into the air (hereafter referred to as 'floating images', including both two-dimensional and three-dimensional images), and its practical application has also been progressing (see for instance Patent Reference No. 1, and Non-Patent Reference No. 1). Methods for sensing user access of floating images include the method of affixing three-dimensional position sensing devices to the hand of the user or to a pointing stick held by the user; another method makes use of pairs of infrared emitters and detectors placed in the vicinity of the floating image to sense the position of the user's hand by the interruption of the infrared beams; still another method uses cameras affixed to the floating imaging device or to the ceiling of the room where it is located, viewing the user's hand from above, and detecting the access by image processing performed on the camera images; and other methods. Furthermore, a new optical device capable of projecting floating images had been proposed, having a surface across which the refracting of light rays can be observed, and having the property that the image is formed with the front and back sides reversed with respect to that surface. By using the above-mentioned optical device with the proper arrangement of the optical structure, it is known that images can be formed in planar symmetric positions with respect to the refracting surface, in other words, mirror images can be formed as real images. In such case, not only two-dimensional but three-dimensional images can be formed, free from distortions.

The present inventor has proposed several optical devices that form images through the reflection of light on specular surfaces; one of them is an imaging optical device (see Patent Reference No. 2) that reflects light by a multiplicity of unit optical elements arranged along the above-mentioned optical device plane, wherein the unit optical elements consisting of at least one specular surface (micromirror) placed in a perpendicular or nearly perpendicular position to that optical device plane. The imaging optical device possesses a new image forming capability, by transmitting light emitted from the object to be projected (including both physical objects and images) placed to one side of the optical device plane, the transmission being achieved by reflecting light at each specular surfaces inside the unit optical elements, whereby a real image of the object to be projected will be formed on the opposite side of the optical device plane. Since the paths of the light rays become bent due to being reflected by specular surfaces while passing through the above-mentioned optical device plane, it can be said that the optical device plane of the imaging optical device functions as a refracting surface.

Another imaging optical device proposed by the present inventor consists of a retroreflector with recursive reflecting capability, and a half-mirror (see Patent Reference No. 3). This imaging optical device operates by recursively reflecting light emitted by the object to be projected and reflected by the half-mirror, then passing the light through the half-mirror; or alternately, by recursively reflecting light emitted by the object to be projected and passed through the half-mirror, then reflecting the light by the half-mirror; in either case, the half-mirror surface functioning as a refracting surface, forming a real image of the object to be projected as a mirror image at a planar symmetric position, without distortion. Therefore with the imaging optical device it will be possible to observe two-dimensional real images in case the object to be projected is two-dimensional, or three-dimensional real images in case the object to be projected is three-dimensional, similarly to a dihedral corner reflector array.

Patent Reference No. 1: JP 2005-141102
Patent Reference No. 2: WO2007/116639
Patent Reference No. 3: JP 2009-025776
Non-Patent Reference No. 1; "3D floating vision", (online), Pioneer Co., Ltd., (searched on Jan. 12, 2007), <URL: http://www.pioneer-pcc.jp/corp/haruka.html>

SUMMARY OF THE INVENTION

Problems to be Solved by the Invention

Among the above-mentioned floating image interaction methods, in case of using the method of three-dimensional position sensors, it is necessary to attach a sensor device to the users' hand, or for the user to hold the sensor or to hold a pointing device with attached sensor; therefore for instance in case of persons just passing by, or in general in case of users who cannot be expected to be holding sensors, interaction with the above-mentioned floating images will not be possible; thus equipping each user with sensors becomes a precondition, that would cause inconvenience. On the other hand, in case of using the method of sensing with infrared emitter and detector pairs, sets of the sensors must be arranged all around the floating images, thus detecting user access in three dimensions would be practically infeasible.

Compared with the above-mentioned methods, using the method of cameras is mostly free of such problems, and it can be said to be practically usable to some extent. However, since it is necessary to place the camera in a position where the floating image is visible without interference from the user's body or other objects, excluding such situations where the camera is allowed to be visible by users, usually there will be physical constraints on the placement of the cameras. Furthermore, in case of the methods having been proposed so far for projecting floating images, it was unfeasible to project distortion-free three-dimensional floating images over a plane such the surface of a table, while keeping their position constant with respect to vertical and horizontal displacements of the viewpoint.

To address the above-mentioned problems, it is possible to solve them by using the imaging optical device proposed by the present inventor (see the above cited Patent Reference No. 2 and Patent Reference No. 3). The imaging optical system (imaging optical device) disclosed in Patent Reference No. 2, by reflecting once each from the above-mentioned two mirror surfaces (hereafter called 'dihedral corner reflectors') the light emitted by the object to be projected that is placed to one side of the above-mentioned optical device plane, and therefore transmitting the light through the optical device plane, causes the undistorted real image of the object to be projected to be formed in the space at the other side of the optical device plane, achieving two-dimensional images for two-dimensional objects to be projected, and three-dimensional images for three-dimensional object to be projected, thus realizing a new way of imaging, and hereafter will be called 'dihedral corner reflector array'. This dihedral corner reflector array uses specular reflection, thus it is suitable for observation from an acute angle with respect to the optical device plane, and therefore it is capable of presenting a floating image appearing above a flat surface. It should be mentioned that the above-mentioned imaging optical device possesses not only the floating image forming mode due to operating as a dihedral corner reflector, but also the operating mode of transmitting light directly through the optical device plane without reflection, or alternatively the single-reflection operational mode, when the light is reflected only once while passing through the optical device plane (see Japanese Patent Application No. 2006-271191). Furthermore, the imaging optical device disclosed in Patent Reference No. 3, similarly to the optical device plane of a dihedral corner reflector array, has a half-mirror plane that also functions as a refracting plane with respect to the light rays between the object to be projected and its real image, and permits the observation of the real image from an oblique angle with respect to the half-mirror surface. In that case, since the refracting surface is a half-mirror, objects on the opposite side of the refracting surface become directly visible by light passing through that refracting surface.

Therefore, the present invention sets out to resolve the above-mentioned problems by using the above-mentioned imaging optical system, and also by making use of those operating modes that are not necessary for the forming of real images; whereby it succeeds in simplifying the construction of the system, while at the same time it can detect precisely access by the user, with the device used for detecting access by the user to the real image capable of being placed in a location hidden from the user's view, thus realizing a floating image interaction device for ideal interaction between images and users, as well as providing computer programs for the floating image interaction device.

Means for Solving the Problems

The floating image interaction device according to the present invention has an imaging optical system and an user object detecting means. The imaging optical system has a light ray refracting surface capable of bending the light paths of light rays, and the imaging optical system, upon an object to be projected being placed to one side of the imaging optical system, forms a real image of the object with the front and back reversed on the opposite side of the imaging optical system. The user object detecting means detects the position or the position and shape of an user object being placed in the vicinity of the real image formed by the imaging optical system.

When a floating image interaction device is constructed according to the preceding paragraph, firstly the imaging optical system forms a floating image of the object to be projected (an object placed to one side of the light ray refracting surface that might be either a physical object or an image displayed on an imaging device, either of which might be two-dimensional or three-dimensional) by the light ray refracting surface bending the light having been emitted by the object to be projected and thus forming the floating image on the other side of the light ray refracting surface. With the image forming method, for instance by using the above-mentioned micromirrors for the image forming system, it becomes possible to achieve the bending of the light rays at the light ray refracting surface at acute angles, and thus it becomes possible to observe real images obliquely with respect to the light ray refracting surface. Furthermore, inasmuch a real image is formed of the object to be projected, while the real image has no physical reality, nevertheless it can be observed to appear floating in the air as a virtual object that exists only visually, and the user can touch or point to the virtual object with his hand or with a pointer. Therefore it becomes possible to detect the three-dimensional position, or the three-dimensional position and shape, of the physical three-dimensional object, that is to say "user object" in the present invention, that is the users' hand, finger or the pointer, by an user object detecting means, whereas interaction (mutual action) of the real image and the user (physical object) becomes easier than with the prior art. It is necessary for the user object detecting means to be able to detect at least the position of the user object that is the hand or the pointer held by the user, but it is desirable to be able to detect both the position and the shape of the user object. It should be noted that the user object detecting means of the present invention can be configured in such a manner, that it becomes possible to detect the position of the real image together with the above-mentioned object. In that case, the user object detecting means can detect the mutual position of both the real image and the part of the user object in its vicinity, whereby such information might be used advantageously for the mutual action of the user (physical object) and the image. However, it should be noted that usually by taking account of the properties of the imaging optical system, and of the position of the object to be projected, it will be feasible to calculate the position of the real image, thus it is not necessarily required to actually measure the position of the real image.

Regarding the above-mentioned floating image interaction device of the present invention, in order to realize the interaction between the floating real image of the object to be projected and the user, whereas the information related to the position or the position and shape of the physical object is detected by the user object detecting means, it will usually be desirable to further incorporate a real image modifying means, to make use of the above-mentioned information for modifying the real image. In other words, the real image modifying means operates by modifying the position and shape of the object to be projected in order to follow the position and shape of the user object in relation with the real image. For instance, assuming that the user object is the finger, and the user action is pushing the real image with the finger, by moving also the real image in such a way that the relative positions of the finger and the real image are preserved, it becomes possible to express situations like the real image having no physical existence being pushed with the finger, or the real image becoming attached to the finger. Alternately, if the finger moves in a way to pinch the real image, by recognizing the position and shape of the finger, thereafter the real image might be moved in a way so the relative position of the finger and the real image is kept constant, expressing a situation as if the real image had actually been caught. In order to modify the real image in the above-mentioned manner, it is advantageous to physically move the object to be projected in cases when it is a physical object, or to modify the image content when the object to be projected is a displayed image. To achieve this in a case when the object to be projected is a physical object, one possible method involves using the information given by the user object detecting means that determines its position, and making use of a program and moving structure capable of moving the object to be projected, thus realizing the real image modifying means. On the other hand, in case the object to be projected is an image, as an example it is possible to use the information given by the user object detecting means that determines its position, and by a program that moves the image, or by a program and a moving means capable of moving the display showing the image, the real image modifying means might be realized. In particular, when the object to be projected is a three-dimensional image, the three-dimensional image might be moved in three dimensions by an appropriate program; while in case the object to be projected is a two-dimensional image, one possibility involves moving the display of the image in a three-dimensional manner; thus realizing the three-dimensional movement of the real image.

Furthermore, besides modifying the real image according to the position or shape of the user object, it is also possible to realize the interaction of the floating image and the user by acting on the user's hand or other such objects in such a way as if they have actually touched the real image. For instance, when the user's hand or an object held by the user reaches the real image, if it is feasible to have a reaction force work upon the hand or user object, it becomes possible to achieve a highly realistic feeling of presence. Furthermore, even without a precise reproduction of the reaction force, providing any tactile stimulus upon reaching the real image will contribute to enhancing the feeling of its presence. Furthermore, upon stroking the real image, by providing an appropriate vibration stimulus, it becomes possible to make its surface texture being felt. In order to realize the above-mentioned effects, the floating image interaction device of the present invention might preferably be equipped also with a user object actuator device, with the user object actuator device providing physical action to the user object using to the position information or the position and shape information obtained by the user object detecting means. In other words, the user object actuator device exerts physical force upon the user's hand or another user object whenever it is detected in the vicinity of the real image, according to the position and shape of the real image. In order to realize this, as an example the above-mentioned user object actuator device might need to be equipped with a program that actuates the user object actuator device according to the information obtained from the user object detecting means.

As an exemplary realization of the user object actuator device, a structure with a mechanical link mechanism might be considered. One example of such a link mechanism might use the position information or the position and shape information obtained by the user object detecting means as haptic information, to provide a feeling of touching the floating real image (for example, the product 'PHANTOM' of SensAble Technologies, URL: http://www.sensable.com/products-haptic-devices.htm). It should be noted that when a link mechanism is used, the information of the angles at each link joint might be measured, and used to obtain the position information of the end point of the link mechanism.

Furthermore, as still another example of a user object actuator device, airflow devices, that is, devices generating airflow movements, might be used, among them devices that eject air jets from narrow nozzles pointing to the users' hand, or air bazookas that eject vortex rings; according to the information about the position or position and shape of the user object as obtained from the user object detecting means.

One concrete realization of the imaging optical system used in the present invention consists of a plurality of unit optical elements, each having at least one specular surface, capable of reflecting light, and placed perpendicularly or nearly perpendicularly to the optical device plane that is operating as a refracting surface; whereby due to the effect of the unit optical elements, upon an object to be projected being placed to one side of the optical device plane, its real image will be formed at the opposite side of the optical device plane.

It is advantageous to consider the above-mentioned unit optical elements as being realized by mirror surfaces, using the internal walls of optical holes penetrating the optical device plane. However, such a unit optical element is only a simplified image, and it does not necessarily correspond to shapes defined by physical boundaries, inasmuch as it is possible for example to realize the above-mentioned unit optical elements not as independent single units but also in a continuous shape. In case of an floating image interaction device of such a construction, firstly by using the imaging optical device, the light emitted from the object to be projected will be reflected at least once from the mirror surfaces of each unit optical element while being transmitted through the optical device plane, whereupon a floating image will be formed at the opposite side of the optical device plane. With such an imaging method, light rays are bent at acute angles due to the reflection on specular surfaces while passing through the optical device plane, thus observation becomes possible at oblique directions with respect to the optical device plane.

As a still more preferable realization of the imaging optical device, the unit optical elements might be realized as mutually perpendicular pairs of specular surfaces, functioning as dihedral corner reflectors, thus constituting a dihedral corner reflector array. In such case, the light emitted by the object to be projected is reflected once each by the two specular surfaces of each dihedral corner reflector, thus forming an image at the opposite side of the optical device plane at a position that is planar symmetric to the position of the object to be projected with respect to the optical device plane. By using an imaging method with such a dihedral corner reflector array, for a two-dimensional object to be projected a two-dimensional real image will be formed, while for a three-dimensional object to be projected a three-dimensional real image will be formed, in each case a distortion-free real image being projected. We should note that when the object to be projected is a three-dimensional object, it will be reversed along the depth direction; however, to correct the depth reversal, the three-dimensional object or the three-dimensional image which are the object to be projected might be constructed in a depth reversed manner; or as another method, two imaging optical devices might be used and the light from the object to be projected might be transmitted sequentially through the two imaging optical devices; thus correcting the above-mentioned depth reversal.

A further possible realization of the imaging optical device used by the present invention consists of a half-mirror that functions as a refracting surface, and recursively reflecting unit retro-reflector elements arranged at the position of recursive reflection of the light transmitted or reflected by the half-mirror and thus forming a retro-reflector array. The retro-reflector array might be placed to the same side of the half-mirror as the object to be projected, or equally it might be placed to the opposite side; or it might be placed simultaneously into both positions. If the retro-reflector array is placed to the same side of the half-mirror as the object to be projected, the light emitted by the object to be projected and reflected by the half-mirror will be recursively reflected by the retro-reflector array, and it will be transmitted through the half-mirror to form the image. On the other hand, if the retro-reflector array is placed to the opposite side of the half-mirror as the object to be projected, the light emitted by the object to be projected and transmitted through the half-mirror will be recursively reflected by the retro-reflector array, and again reflected by the half-mirror, thereupon forming the image. In case of such an imaging optical system, no actual bending of light rays occurs upon passing through the half-mirror plane, instead such bending occurs actually during the recursive reflection; however, as a result, light paths are formed equivalently to as if they were bent during transmission through the half-mirror plane. Due to this, for this imaging optical device the half-mirror plane is considered as the refracting surface. Inasmuch as the light rays passing through the refracting surface behave as if being bent by an acute angle, observation from oblique directions with respect to the half-mirror surface becomes possible. As for the retro-reflector array, it might be realized by a set of corner-cube reflectors consisting of one inner corner surface of cubic shapes, or by a set of cat's eye retroreflectors, or by other means.

In case of such floating image interaction device, by the placement of the user object detecting means to a fixed position relatively to the refracting surface, it is possible to determine in advance the relative position of the refracting surface and the user object detecting means, thus it becomes easy to determine the position of the user object. Furthermore, if the position of the object to be projected is also determined in advance, the position of the real image can be readily calculated by making use of the optical properties of the imaging optical system, therefore it becomes possible to determine the relative position of the real image and the user object.

In particular, as an exemplary realization of the user object detecting means, it might consist of at least one camera and an image processing device, whereas the image processing device analyses the image obtained by the camera in order to detect the position or the position and shape of the user object. As already mentioned above, it is possible to record also the image of the real image by the camera, and determine the relative position of the user object and the real image by image processing using the image processing device. Furthermore, concerning the cameras, by placing at least two cameras into fixed positions, it is possible to perform a triangulating calculation by the image processing device, thus determining the three-dimensional positions of each point of the user object, and thus obtaining information about the shape of the user object. In case the real image is also being recorded, it is possible to determine the three-dimensional position and shape of the user object and the real image. Furthermore, by using at least 3 cameras, it is possible to achieve position and shape detection with even higher precision. As for the method for position detection with cameras, any suitable method might be used. For instance, in case when matching points in camera images are used for distance measurement, the texture of the user's hand or user object approaching the real image might be used for finding matching points; or markers might be placed into appropriate positions and used as matching points; or another method involves projecting grid lines or stripe patterns apart from the object to be projected and its real image to be used as matching points. In addition, it is possible to use distance imaging based on TOF (Time of Flight) methods. In case of recording a distance image, only one camera is needed to measure three-dimensional position and shape information. Upon obtaining measurement information about the three-dimensional position and shape of the user object, a shape recognition means is used to identify the shape of the user object. The shape recognition means can be realized by a shape recognition program and a computer to run that program. For instance, if the user object is the fingers of a hand, it becomes possible to recognize when the thumb and the index finger touch each other (for instance, when they are virtually grasping the real image). Next, the recognition result of the shape recognition means is fed to the action recognition means, whereupon the action of the user is recognized from the temporal sequence of consecutive shape changes. Therefore, as an example it is possible to recognize a pinching action from the sequence of the thumb and the index finger moving to touch each other. By using such a recognition result, it becomes possible to recognize the intention of the user as to grasp the floating image; whereas by recording the relative position of the real image and the user's hand in the moment of grasping, in case the subsequent movement is with the hand still in the grasping position, by modifying the real image in such a way as to preserve the relative position, it becomes possible to express such an effect as if the user has actually grasped the real image.

If according to the preceding paragraphs, at least one camera is incorporated into the user object detecting means, by placing those camera or cameras to the same side of the refracting surface of the imaging optical system with the object to be projected, those cameras will be located in a position hidden from the user, thus contributing to the miniaturization of the device itself, as well as to the improvement of its external appearance.

The recording of the image of the user object with cameras is possible directly through the refracting surface. In particular, when the above-mentioned imaging optical system consisting of a plurality of unit optical elements is used, with one example being the dihedral corner reflector array, by locating those cameras on the same side of the optical device plane serving as the refracting surface like the object to be projected, along locations from where the user object can be recorded through the refracting surface without even a single reflection on the specular surfaces of the unit optical elements, it becomes possible to record directly through the refracting surface with those cameras the user (user object) approaching the real image. The above-mentioned effect is possible due to the existence of multiple operating modes according to the number of reflections for the imaging optical device. Whereas the unit optical elements are formed as specular surfaces on the internal walls of optical holes, depending on the viewing direction, light passing through those optical holes without any reflections might be observed, the observation being equivalent to viewing an object simply through a multiplicity of holes. Furthermore, in the case of the imaging optical system consisting of a half-mirror and a retroreflector, by making use of light rays passing directly through the half-mirror, the user object can be directly recorded by cameras through the refracting surface that is in this case the half-mirror.

Furthermore, it is possible to place a half-mirror between the refracting surface and the object to be projected, and locate the camera in such a position where it can record the real image formed by the imaging optical system from the image of the object to be projected as reflected by the half-mirror. The imaging optical system of the present invention, as explained in the preceding, forms a real image of the object to be projected in a planar symmetric position with respect to the refracting surface of the imaging optical system; but since this effect is symmetric with respect to the refracting surface, as the user's hand or user object approaches the real image, the real image of the user object will also be formed in a planar symmetric position with respect to the refracting surface. In that case, as the user object reaches the immediate vicinity of the real image, the real image of the user object will also appear in the immediate vicinity of the object to be projected. Therefore if a half-mirror is placed between the refracting surface and the object to be projected; or more specifically, into the light path of the light rays emitted by the user object between the refraction point on the refracting surface and the point of image forming; then the light rays will form a real image at a planar symmetric position to the original position of the real image of the user object with respect to the refracting surface; therefore the real image of the user object becomes separated from the object to be projected. As a result, by recording the real image of the user object as separated by the half-mirror, it becomes possible to determine accurately the position and shape of the user object without directly recording it.

Furthermore, in case of using an imaging optical system consisting of a plurality of unit optical elements, with one example being the dihedral corner reflector array, there is an image forming mode by single reflections of light on the specular surfaces of the unit optical elements, thus cameras may be placed at positions where the image of the user object might be recorded due to the above-mentioned image.

Still further, the user (user object) can be similarly recorded by locating the camera in positions from where the user object might be recorded without the light passing through the refracting surface. In concrete terms, the periphery of the refracting surface might be penetrated by holes, and through those holes cameras would be able to record from the same side as the object to be projected the user (user object) approaching the real image.

Apart from the above-mentioned methods of locating the camera, it is also possible to place the camera to the same side of the refracting surface of the imaging optical system as the real image, whereas detecting the position of the user object or the user object together with the real image will also be feasible. However, so far as it desired to construct the system in a way as to hide the presence of the camera from the user, due care must be taken in designing the location of the camera.

Whenever the user object detecting means makes use of cameras, it is recommended to apply at least one distance detecting camera that is capable of recording distance images. In that case, it becomes possible to measure the distance and direction to the user object with a single camera, thus position detection will be feasible with one camera. Furthermore, by using two or more distance detecting camera, position measurements with higher precision might also be achieved.

In the case of the above-mentioned floating image interaction device, in order to preferably realize the interaction between the floating real image and the user (user object), the computer program according to the present invention that is used in that device will be a program having an user object detection procedure and an user object information generating procedure. The user object detection procedure makes the above-mentioned user object detecting means measure the position or the position and shape of the user object and using information based on that measurement, determines the position or the position and shape of the user object. Wherein the user object information generating procedure, an information related to the position or the position and shape of the user object as determined by the user object detection procedure is generated for use by a suitable interaction program, such as interaction program controlling the user object based on the position or the position and shape of the user object. The user object detection procedure makes use of the measurement results about the three-dimensional position of the user object, or the three-dimensional position of each point of the user object, obtained by the above-mentioned user object detecting means; in order to determine the position or the position and shape of the user object. In particular, for the recognition of the shape of the user object, it is possible to include a shape recognition program into the program processing the user object detection procedure, whereas for instance in the case when the user object is the hand of the user approaching the real image, the shape of that hand might be recognized, thus for instance the contact of the thumb with the index finger (for instance, the situation of virtually grasping the real image) becomes possible to recognize. Furthermore, in case the movement of the user object is also to be recognized based on the above-mentioned shape recognition results, a movement recognition program might also be incorporated into the user object detection procedure, and by inputting the output information of the user object detection procedure, it is possible to recognize movement as a consecutive temporal sequence of shape changes. By this method, it becomes possible to recognize, as an example, the process of the thumb and the index finger touching each other, thus to recognize the above-mentioned grasping action. By using the above recognition results, it becomes possible to recognize the intention of the user to grasp the floating image and record the relative position of the real image and the hand in the moment of grasping; thereafter as long as the hand moves while maintaining the grasping posture, by modifying the real image in such a manner as to maintain the relative position, it becomes possible to express the interaction effect of the user holding the real image.

Effects Achieved by the Invention

The floating image interaction device of the present invention is capable of forming a real image (floating image) of the object to be projected irrespective of whether the object to be projected is two-dimensional or three-dimensional and whether it is a physical object or a displayed image, due to making use of an imaging optical device having specular surfaces arranged nearly perpendicularly to the optical device plane, realized by the above-mentioned unit optical elements such as dihedral corner reflectors or an imaging optical system realized by a half-mirror and a retro-reflector, or such; and furthermore it is possible to determine the three-dimensional position of the user's hand or such as it approaches the floating image; thus it represents a great advance in the art of interaction between users and floating images, as realized by modifying floating images according to user access. In particular, in case of using a plurality of cameras as the user object detecting means, due to the advantageous choice of location for the cameras with respect to the imaging optical system, it becomes easy to reduce the size of the floating image interaction device itself, thus facilitating its easy installation or relocation.

DETAILED DESCRIPTION OF THE INVENTION

Hereinafter, preferred embodiments of the present invention are described below with reference to the drawings.

Figure 1:
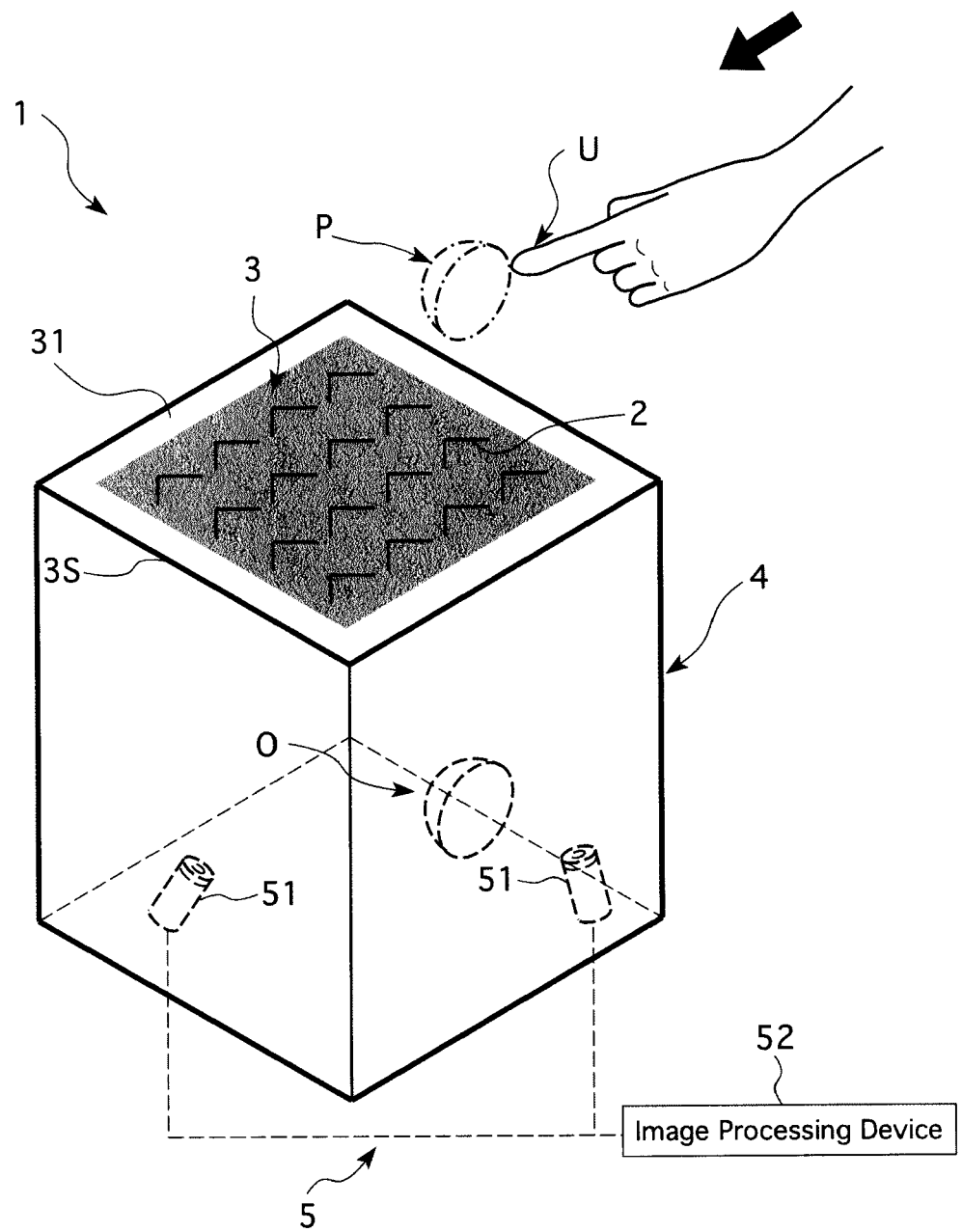
FIG. 1 is an outline drawing of the configuration of the floating image interaction device of the first embodiment of the present invention.

<First Embodiment> The first embodiment of the present invention is a floating image interaction device 1 with its basic structure shown schematically in FIG. 1. This floating image interaction device 1 has a substrate 31 equipped with a real mirror imaging optical device 3 (hereafter called 'dihedral corner reflector array') constructed of a plurality of dihedral corner reflectors 2; an enclosure 4 having that substrate 31 as its lid; two cameras 51 located in the interior of enclosure 4; and an image processing device 52 connected to cameras 51. The two cameras 51 and the image processing device 52 together constitute the user object detecting means 5. The object to be projected O that becomes the origin of the real image projected to the space above substrate 11 is placed inside enclosure 4. Since the dihedral corner reflector 2 is extremely small compared with the whole of the dihedral corner reflector array 3, in FIG. 1 the whole set of the dihedral corner reflectors 2 is indicated by grey shading.

The object to be projected O might be chosen to be any of the following: an (effectively) two-dimensional object such as an image drawn on paper; a three-dimensional object; or a two-dimensional or three-dimensional displayed image. In case a physical object is chosen as the object to be projected, and it does not have itself light emitting capability, then lighting fixtures (not shown in the drawing) might be placed inside the enclosure 4 in order to illuminate the object to be projected O. On the other hand, in the case when the object to be projected O is a displayed image, screens or displays (not shown in the drawing) might be placed inside the enclosure 4, and if necessary, in order to project images on those screens or displays, projector devices or computers might be connected.

Figure 2:
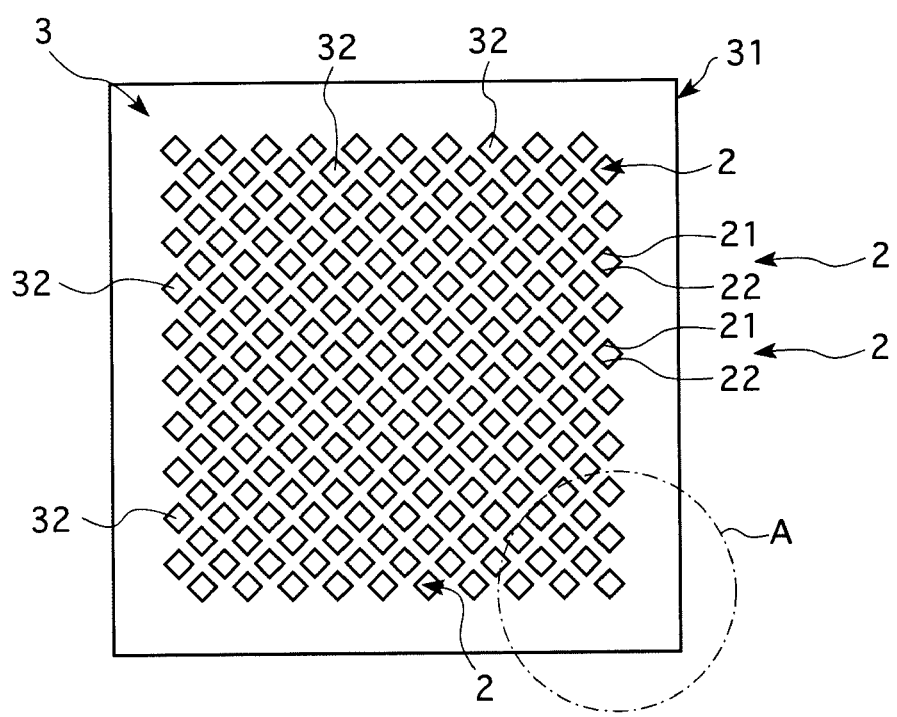
FIG. 2 a plane drawing of the dihedral corner reflector array used by the first embodiment of the present invention.

The dihedral corner reflector array 3 as shown in FIG. 2 is constructed by preparing a plurality of holes 32 penetrating perpendicularly the flat surface of substrate 31 in the thickness direction, and equipping two mutually perpendicular inner walls of each of those holes with two specular surfaces 21 and 22, in order to render each hole 32 into a dihedral corner reflector 2.

Figure 3:
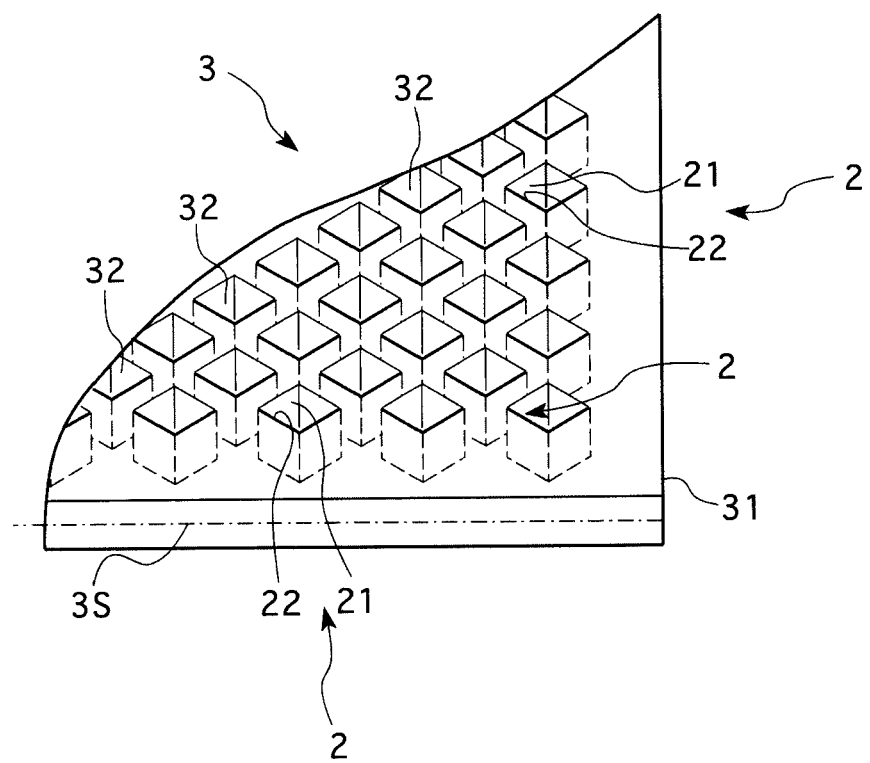
FIG. 3 is an enlarged perspective drawing of one portion of the dihedral corner reflector array of the first embodiment of the present invention.

Substrate 31 has the form of a thin slab with a thickness between 50 to 200 um; in the present embodiment it is set to 100 um thickness; while in the present embodiment we use a flat square shape with each side having the same dimension of 5 cm, the thickness and lateral dimensions of substrate 31 are not restricted to the above-mentioned dimensions, but might be chosen appropriately as desired. As shown in detail A of FIG. 2, shown enlarged in FIG. 3, each dihedral corner reflector 2 is created by preparing physical and optical holes penetrating substrate 31 in order to allow light to be transmitted. In the present embodiment, firstly a plurality of rectangular (in the present example, square) holes 32 are prepared across substrate 31; then for each hole 32 a pair of adjacent inner walls are prepared with flat mirror finish into specular surfaces 21 and 22; thus those specular surfaces 21 and 22 serving as the dihedral corner reflectors 2. It is preferable for other parts of hole 32 besides those used for the dihedral corner reflector 2 to be processed into non-reflecting surfaces instead of preparing them with mirror finish, or to tilt them, or use other methods in order to avoid multiple reflections. Each dihedral corner reflector 2 is made in such a way so that the direction of the inner angle enclosed by the specular surfaces 21 and 22 along substrate 31 points in the same direction. Hereafter the direction of the angle between the specular surfaces 21 and 22 shall be called the direction (aspect) of the dihedral corner reflector array 3. Regarding the manufacturing of specular surfaces 21 and 22, in the present embodiment firstly a metal mold is prepared, then the inner walls for the specular surfaces 21 and 22 are processed by nanoscale cutting into mirror surfaces, with a surface roughness not exceeding 10 nm, to serve as uniform specular surfaces for the entire band of the visible spectrum.

In concrete terms, the specular surfaces 21 and 22 of each dihedral corner reflector 2 might have a side length of 50 to 200 um, in case of the present embodiment they are set to 100 um to match the thickness of substrate 31; after the metal mold has been manufactured it is used in a nanoscale pressing process called nano-imprint process or in an electroforming process, so that in a single substrate 21 a plurality of dihedral corner reflectors 2 shall be formed. In the present embodiment each side of the dihedral corner reflectors 2 of the dihedral corner reflector array 3, those sides forming a V shape along the optical device plane 3S, is arranged at 45 degrees with respect to the width and depth of substrate 31, and all of the dihedral corner reflectors 2 are located along the grid points of an imaginary mesh laid on the optical device plane 3S facing in the same direction. By making the distance between two adjacent dihedral corner reflector 2 as small as possible, the light transmittivity of can be improved. Furthermore, those regions of substrate 31 without dihedral corner reflectors 2 are treated with light absorbing coating, and thin transparent reinforcing plates, not shown in the drawing, are placed on the top and bottom surfaces of substrate 31. In the present embodiment a dihedral corner reflector array 3 with several tens or hundreds of thousands of dihedral corner reflectors 2 is employed.

In case substrate 31 is manufactured by electroforming from metals like aluminum, nickel, or such, when the surface roughness of the specular surfaces 21 and 22 on the mold is sufficiently low, they become naturally mirror surfaces. On the other hand, if substrate 31 is manufactured from plastic or such using nano-imprint technology, it might be necessary to prepare mirror surface coatings by sputtering or such in order to create the specular surfaces 21 and 22.

When dihedral corner reflectors 2 are created along substrate 31 in the above-mentioned manner, they shall have the property that light entering a hole 32 from the bottom (or top) side of substrate 31 shall be reflected from one of the specular surfaces (21 or 22), then the reflected light shall be once more reflected by the other specular surface (22 or 21), thus passing through to the top (or bottom) side of substrate 31; when viewing from the side the path of that light, the entrance light path and the exit light path will be planar symmetric with respect to the substrate 31 (optical device plane 3S) between them, therefore by preparing in the above-mentioned manner a multitude of dihedral corner reflectors 2 along substrate 31, they will behave as a dihedral corner reflector array 3. Therefore the optical device plane 3S (assuming a plane passing through the center of substrate 31 in its thickness direction, perpendicularly to each specular surface, indicated by an imaginary line in the drawing) shall be a plane across which the floating real image P (see FIG. 1) of the object to be projected O that is placed to one side of substrate 31 shall be formed on the other side in a planar symmetric position. In the present embodiment the optical device plane 3S of the dihedral corner reflector array 3 is employed as a refracting surface across which the light paths passing through the dihedral corner reflector array 3 are being bent.

Figure 4:
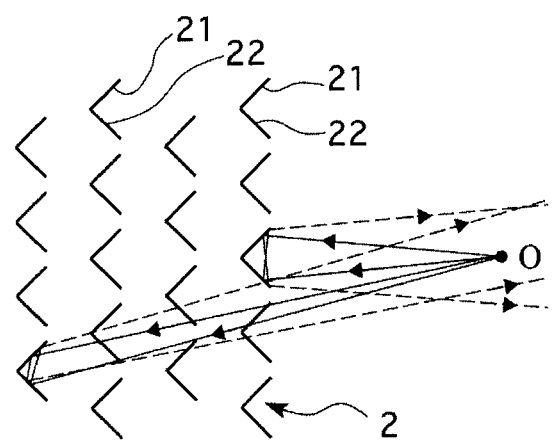
FIG. 4 is a plane drawing showing schematically the imaging process of the dihedral corner reflector array of the first embodiment of the present invention.
Figure 5:
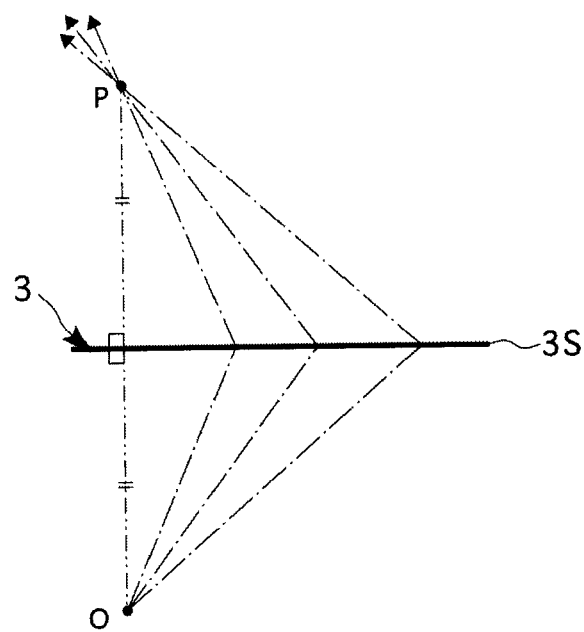
FIG. 5 is a side view drawing showing schematically the imaging process of the dihedral corner reflector array of the first embodiment of the present invention.
Figure 6:
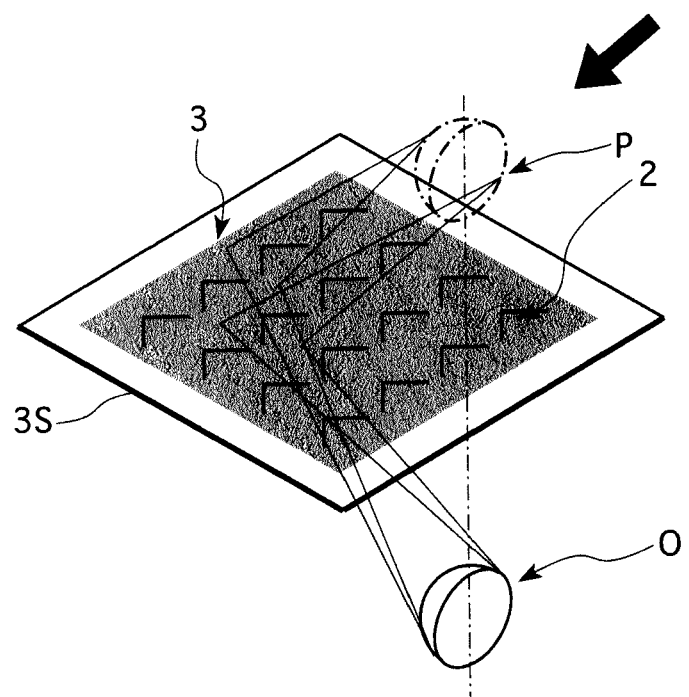
FIG. 6 is a perspective drawing showing schematically the imaging process of the dihedral corner reflector array of the first embodiment of the present invention.

Hereafter the process of imaging by a dihedral corner reflector array 3 of the present embodiment shall be explained together with the light path of lights emitted from the object to be projected O. As shown in a plane drawing in FIG. 4 and in a side view drawing in FIG. 5, light (in the direction of the arrow, indicated by solid line; in FIG. 4, in a three-dimensional sense passing from the space behind the paper to the space above it) emitted from the object to be projected O (indicated by a point in the drawings) as passing through the hole 32 prepared in the substrate 3 for the dihedral corner reflector array 3, shall be reflected once from one specular surface 21 (or 22) forming the dihedral corner reflector 2, then again reflected (reflected light paths indicated by broken lines) from the other specular surface 22 (or 21), therefore in a planar symmetric position to the object to be projected O with respect to the optical device plane 3S of the dihedral corner reflector array 3, will form the real image P of the object to be projected O. The real image P as shown in FIG. 6 will be observable from oblique directions (the direction of the arrow in the drawing) with respect to the substrate 31, in such positions where the specular surfaces 21 and 22 of the dihedral corner reflectors 2 of the dihedral corner reflector array 3 are visible. More specifically, as light is reflected by two mutually perpendicular specular surfaces 21 and 22, among the components of the light direction, the component that is parallel to the surface of substrate 31 (in other words, the component that is parallel to the optical device plane 3S) shall return in the direction from where it came, whereas the component that is parallel to the surface of the specular surfaces 21 and 22 shall be preserved as it was. As a result, light passing through the dihedral corner reflector array 3 with two reflections shall always pass through a point in a planar symmetric position with respect to the optical device plane 3S. Therefore as light is being emitted in every direction from the object to be projected O as a light source, insofar as those light rays are reflected twice by the dihedral corner reflectors 2 while passing through the dihedral corner reflector array 3, all of them will converge in the same point making it a focus point.

As explained above, light passing through the dihedral corner reflector array 3 while being reflected twice shall be focused to a planar symmetric point, therefore focus points will be possible in a wide range along the depth direction (in the direction perpendicular to the optical device plane 3S). It should be noted that while in FIG. 4 the entering and exiting light paths are shown parallel to each other, this happens due to the dihedral corner reflector 2 being shown in the drawing at an exaggerated size compared with the object to be projected O; in reality, each dihedral corner reflector 2 has extremely small size, therefore when the dihedral corner reflector array 3 is seen from above similarly to the drawing, the entering and exiting light paths will nearly overlap each other. Effectively, transmitted light will converge at a point in a planar symmetric position from the object to be projected O with respect to the optical device plane 3S, thus in FIG. 5 at position P a real mirror image shall be formed. Thus when as the object to be projected O a three-dimensional object or a three-dimensional image is placed in the space under the substrate 31, a real image P will appear floating above substrate 31. However, in the real image P the concave and convex features are reversed; to prevent such reversal of convexity and concavity in the real image P, it is preferable to prepare the object to be projected O with convex and concave features already reversed; or alternately, two dihedral corner reflector arrays 3 might be used above each other placed at an appropriate distance.

For the two cameras 51, for instance digital cameras with solid state imaging devices like CCD or CMOS or such might be used. Those cameras 51 might be located at fixed positions inside the enclosure 4 around the object to be projected O facing in the direction of the real image P, so that they can record the light passing directly through the holes 32 in the substrate 31 (direct light) from the area around the real image P that is to be observed. Therefore, the user (the user object) U accessing the real image P (see FIG. 1) is recorded by cameras 51. It should be noted that inasmuch the real image P is projected in the upwards direction, cameras 51 located inside the enclosure 4 shall not record the real image P, only the user (user object) U.

Thereafter, the image recorded by the cameras 51 is inputted to the image processing device 52. In the image processing device 52 an image processing program and an user object recognition program is running, and based on the image recorded by cameras 51, the image of the user (user object) will be found (in the flowchart of FIG. 7, see step S1), and in the region of triangulating measurement, the three-dimensional position of each point of the user (user object) will determined (step S2).

In case when the position of the dihedral corner reflector array 3 and the position of the object to be projected O are known with respect to the enclosure 4, making use of the rule that the real image P always appears in a planar symmetric position to the object to be projected O with respect to the optical device plane 3S, the three-dimensional position of the real image P can be calculated.

Furthermore, by the appropriate placement of cameras 51, it becomes possible to use not the direct light from the user (user object) U but instead to make use of the image formed due to light reflected once from one of the specular surfaces 21 or 22 of the dihedral corner reflectors 2 (single-reflection light) to observe the user (user object) U. Although the image is not formed at a planar symmetric position, still its position obeys certain rules, thus it is possible to calculate it in advance, and therefore the position of the user (user object) U can be determined. Insomuch as the observation of the user (user object) U becomes possible from a different direction than in the case of using direct light, the current method might be advantageous in situations when the shape or position of the object to be projected O makes observation with direct light difficult.

By using the information about the three-dimensional position of the user (user object) U (or in addition the information about the three-dimensional position of the real image P) obtained by the aforementioned process, the shape recognition program that forms a part of the user object detection procedure performs appropriate calculations on it, and the determination of the shape of the user (user object) U is executed (step S3 in the flowchart). Furthermore, recognition of actions of the user (user object) U (such as grasping, pinching, stroking and so on) is performed. In order to realize feedback such as modification of the real image and response to the user (user object) U, a movement recognition program is incorporated as one component of the user object detection procedure, and based on the consecutive temporal sequence of the recognition results received from the shape recognition program, actions of the user are determined (step S4 in the flowchart). In such a case when the shape recognition and action recognition of the user (user object) U are not required, in step S2 of the flowchart only the three-dimensional position of the user (user object) U needs to be performed, and the shape recognition step S3 and the action recognition step S4 might be omitted. Furthermore, if an appropriate control program controls the object to be projected O that is for instance a physical object or a displayed image, the results are fed to the control program (step S5). The above-mentioned control program might be a program that in responding to access by the user (user object) U to the real image P, modifies the shape or position of the object to be projected O, and might be realized as a program forming part of the real image modifying means introduced later, or as a program controlling the user object actuating device. In particular, when the object to be projected O is a displayed image, the control program might work by changing the displayed image of the object to be projected O into some other image. In case both the position and the shape of the user (user object) U is to be used, in step S3 information about the three-dimensional positions of each point of the user (user object) U might be generated, and after recognition of the user (user object) U is performed based on that information, output for the control program can be executed. As for the shape recognition program, generally used pattern recognition algorithms might be used.

As elaborated in the preceding, by using the floating image interaction device of the present embodiment according the above-mentioned method, insofar as the real image P of the object to be projected O can be projected in a two-dimensional or two-dimensional manner into the space above the optical device plane 3S, the three-dimensional position of the user (user object) U accessing the real image P is readily determined. Therefore, for instance by using the three-dimensional position information of the user (user object) U to be processed by the program controlling the movement of the object to be projected O, it becomes readily possible to move or modify the object to be projected O or its real image P according to the position of the user (user object) U, therefore the virtual interaction between the real image P and the user (user object) U is readily realized. Furthermore, inasmuch as with the floating image interaction device 1 it is not necessary to affix any sensor device to the user (user object) U to determine its three-dimensional position, for instance even for a passing-by user wishing to use the floating image interaction device 1, using it is possible without any hindrances. Furthermore, since it is not needed to place infrared sensor pairs around the floating image interaction device 1 to determine the position of the user (user object) U, the floating image interaction device 1 might be constructed in a compact size, making its installation or relocation easy.

Figure 8:
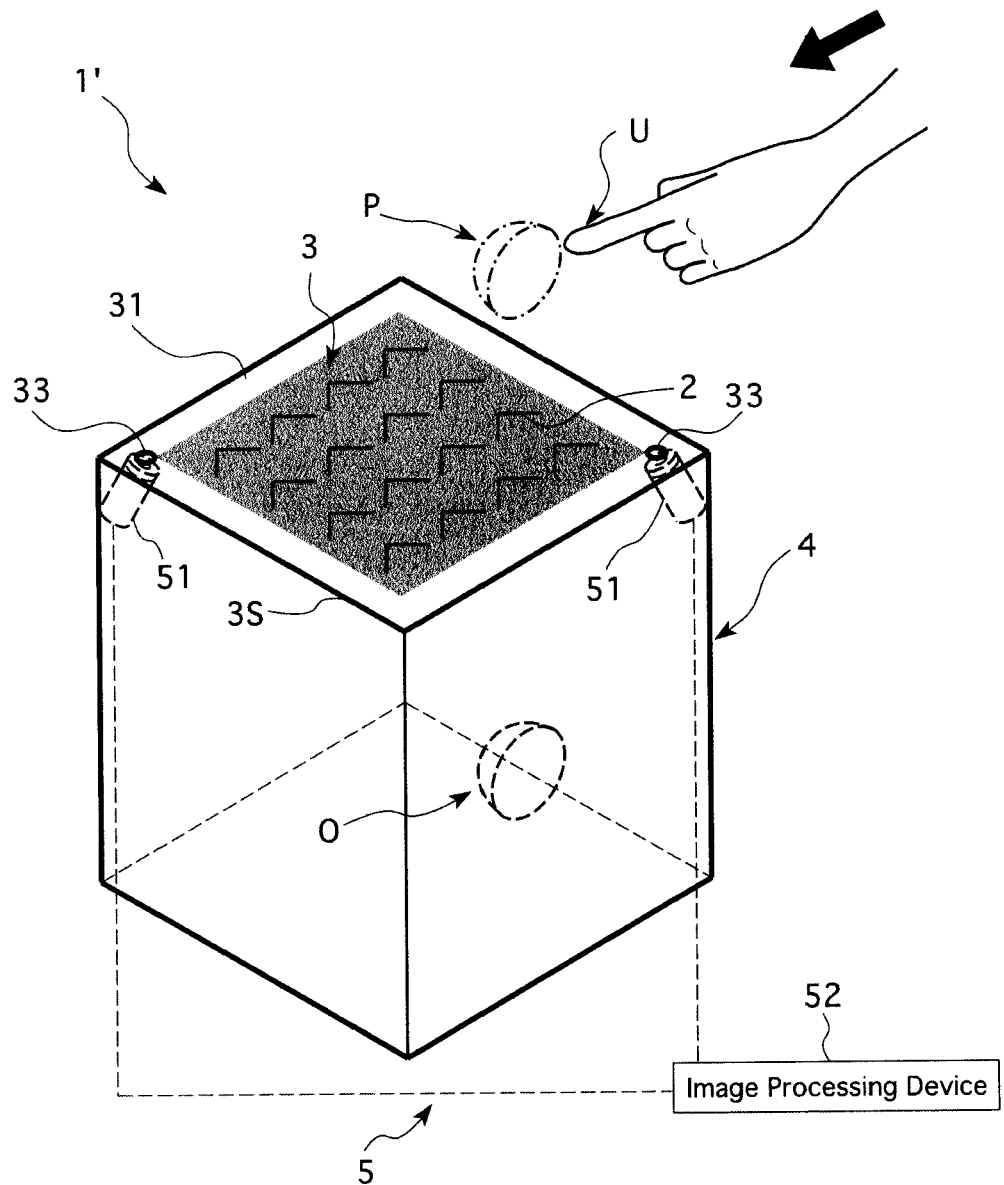
FIG. 8 is a drawing of another configuration of the floating image interaction device of the first embodiment of the present invention.
Figure 9:
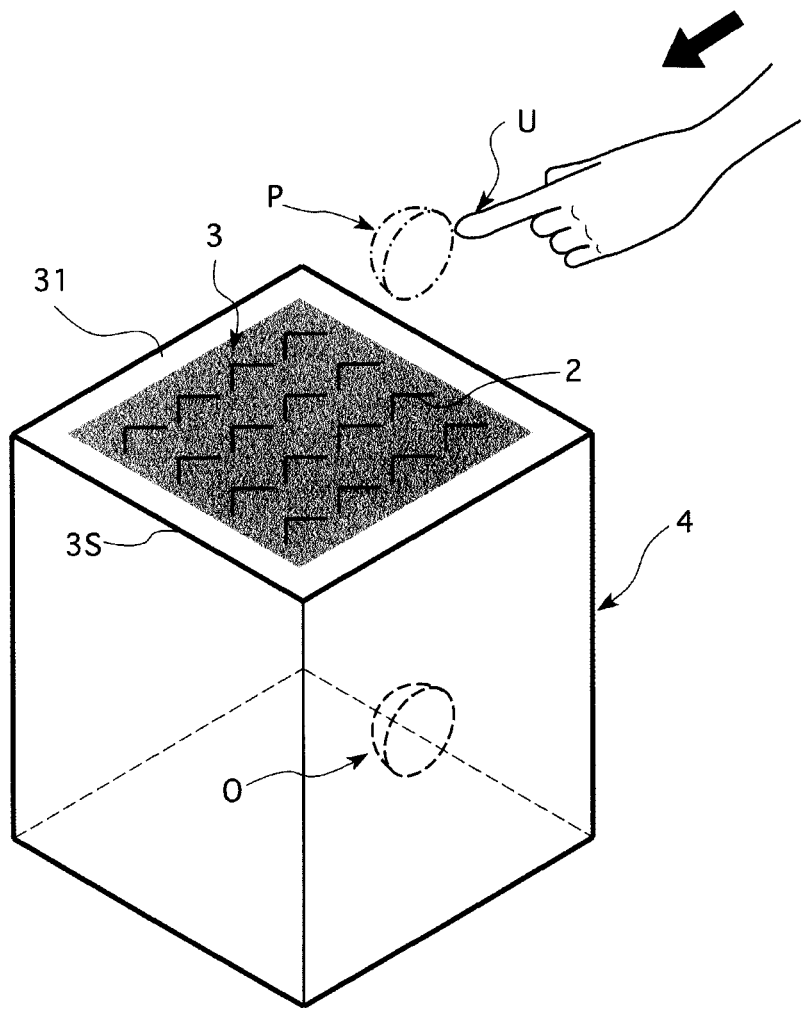
FIG. 9 is a drawing of still another configuration of the floating image interaction device of the first embodiment of the present invention.

It should be mentioned that the present embodiment is not restricted to the above-mentioned realization. For instance, it is possible to change the location for the cameras 51 used in the above-mentioned embodiment for the user object detecting means 5 as described in the following. For instance, for the floating image interaction device 1' as shown in FIG. 8, if it is feasible to open two small holes 33 around the periphery of the dihedral corner reflector array 3, those holes 33 might be constructed in order to allow the cameras 51 to observe the user (user object) U through them. In such a case, the cameras 51 should be located with such an attitude that they can observe the surroundings of the real image P. By the above method, it becomes possible for the cameras 51 to record the image of the user (user object) U directly, thus undesired effects of stray lights or blurring due to the light passing through the dihedral corner reflector array 3 can be prevented. Furthermore, for the floating image interaction device 1" as shown in FIG. 8, it is possible to use a configuration with the cameras 51 located in the space above the substrate 31. In the example shown in the above drawing, a configuration is shown where the cameras 51 observe the surrounding area of the real image P at an angle from above, with the cameras being placed on supports that are not shown in the drawing; however, with this configuration it is also possible to locate the cameras 51 in such a manner that they observe the surrounding area of the real image P at an angle from below. In such a case it is also possible to record the image of the user (user object) U directly, thus undesired effects due to the light passing through the dihedral corner reflector array 3 can be prevented.

Figure 10:
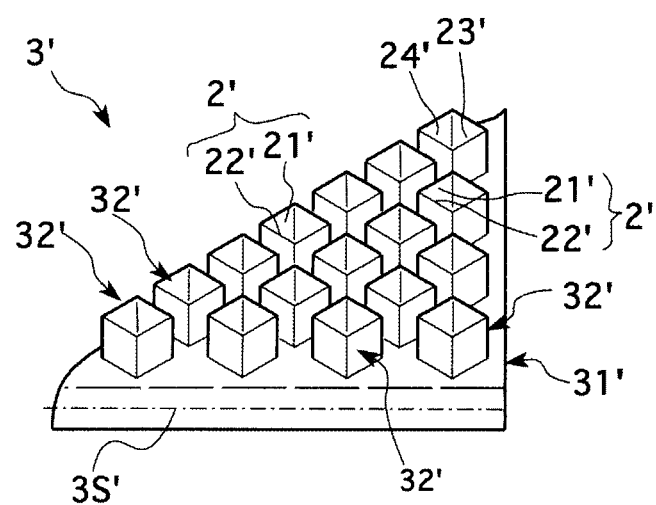
FIG. 10 is a perspective drawing of another example of a dihedral corner reflector array applicable for the first embodiment of the present invention.

Furthermore, in order to realize the dihedral corner reflectors 2 constituting a dihedral corner reflector array 3, it is enough to have two mutually perpendicular specular surfaces; thus for such specular surfaces a plane of a reflecting material with mirror-grade finish or with mirror coating might be used, or the boundary between two transparent materials with different refracting indices that cause total internal reflection and having mirror-grade surface quality might also be used. More concretely, in the above-mentioned embodiment, for the dihedral corner reflector array 3, as an example the dihedral corner reflectors 2 were realized by creating optical holes by square holes penetrating the thin slab shaped substrate 31, and equipping two adjacent inner walls of the holes with specular surfaces 21 and 22; however, as an alternative to the above-mentioned configuration, as shown in FIG. 10, transparent tubular bodies jutting out from the surface of substrate 31' in its thickness direction might be used to realize the unit optical elements 2', and by arranging a multitude of the tubular bodies in a rectangular mesh pattern, a dihedral corner reflector array 3' might be realized. In that case, the mutually perpendicular first inner surface and second inner surface can serve as the specular surfaces 21' and 22', thus constituting the dihedral corner reflector 2'. In that case, similarly to the case of the preceding embodiment, the light being reflected twice by the dihedral corner reflector 2' passes through a planar symmetric point with respect to the surface of the substrate 31', that is, to the optical device plane 3S'; thus in a suitable spatial region not only two-dimensional but also three-dimensional images can be formed. Furthermore, by making the walls of the tubular bodies other than those used for surfaces 21' and 22', that is the walls 23' and 24' into non-reflecting surfaces, or equipping them with a non-perpendicular tilting angle with respect to the optical device plane 3S', unwanted reflections can be prevented, resulting in a clearer image. Furthermore, the two specular surfaces 21' and 22' constituting the dihedral corner reflector 2' might use total internal reflection, or alternately they might be processed with mirror coating. In particular, when the specular surfaces 21' and 22' operate by the principle of total internal reflection, insofar as total internal reflection has a critical angle, it can be expected that multiple reflections will be less likely to occur. Furthermore, by equipping the surfaces of the tubular bodies that are to be used as specular surfaces with metallic mirror coatings, adjacent tubular bodies might be bonded together. In that case it becomes necessary to equip the other surfaces besides the specular surfaces with some non-reflecting coating; however, the aperture ratio will be improved, resulting in a dihedral corner reflector array with excellent light transmission properties.

Furthermore, as for the two specular surfaces constituting the dihedral corner reflectors 2, so far as two mutually perpendicular mirror surfaces can be prepared, it is not necessary for them to touch each other, but might be arranged with a gap between them; furthermore, in case of the aforementioned holes or tubular bodies, there is no constraint on the angle between the two specular surfaces constituting the dihedral corner reflectors and the other surfaces. For the unit optical elements, shapes having planar projections of other polygons besides rectangles, or triangles, or shapes where the external ends of the two specular surfaces are connected with a shape having an approximately circular arc as a planar projection, or such, might also be used. It should be noted that using a shape with planar projection of a right triangle as the unit optical elements means using a right prism for the unit optical elements.

Figure 11:
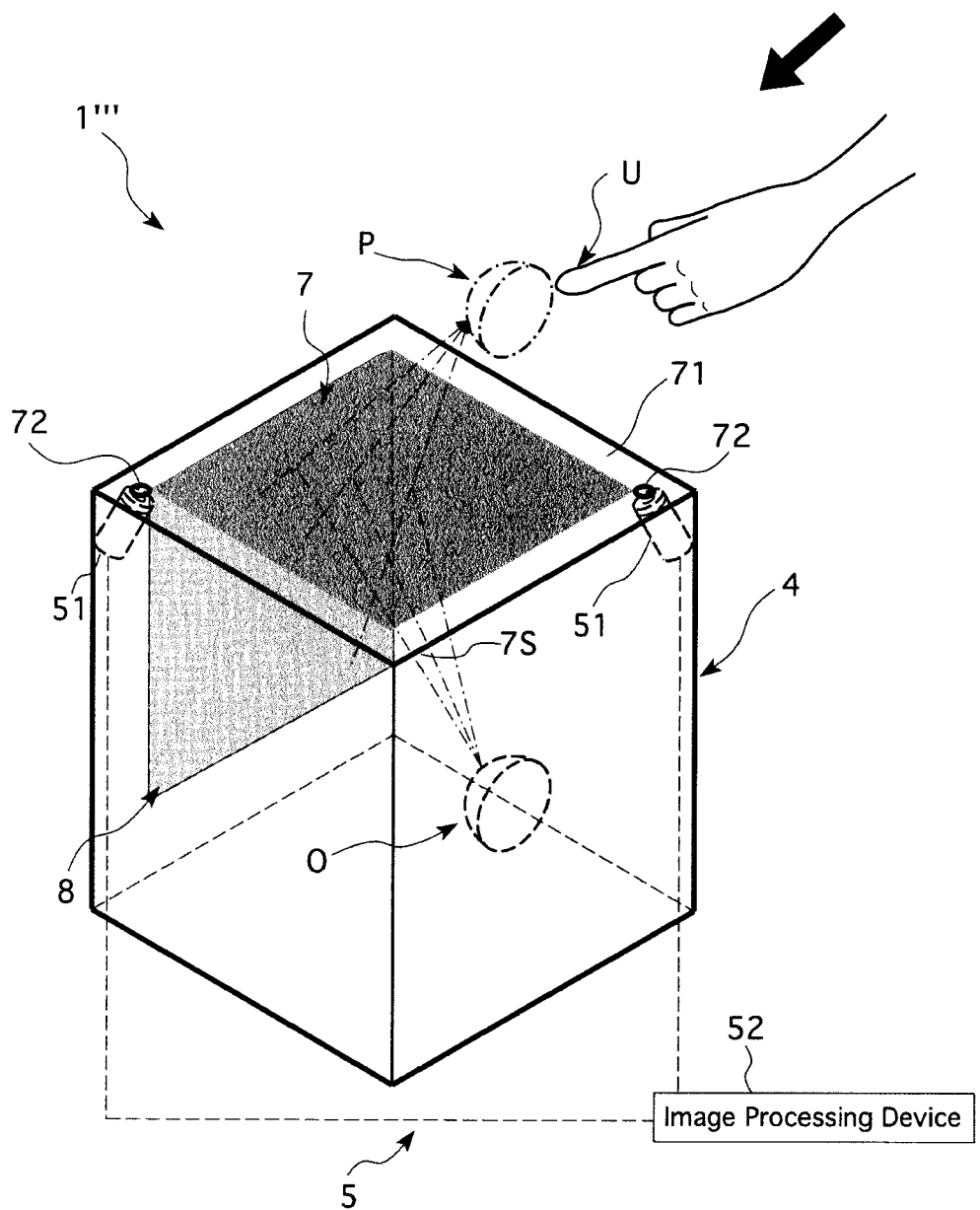
FIG. 11 is an outline drawing of the configuration of the floating image interaction device of the second embodiment of the present invention.

<Second Embodiment> The second embodiment of the present invention is a floating image interaction device 1''' with its basic structure shown schematically in FIG. 11. The floating image interaction device 1''' differs from the floating image interaction device 1' introduced as a variant of the first embodiment only in the imaging optical system that is used, and otherwise they are approximately equivalent, thus hereafter the same symbols like those used for the first embodiment will be used in the explanation for common constituting parts. The present embodiment has an imaging optical system 6 consisting of a half-mirror 7 and a recursively reflecting optical device (hereafter called 'retroreflector array') 8 that is used as the real mirror imaging optical system; further it has an enclosure 4 with the half-mirror 7 inserted into its lid 71; two cameras 51 located in the interior of the enclosure 4; and an image processing device 52 connected to the cameras 51. There are two small holes 72 made into the outside part of lid 71 housing the half-mirror 7, in order to enable the cameras 51 to observe the user (user object) U through the small holes 72. Inside the enclosure 4 is located the object to be projected O that is the source of the real image P projected to the space above the half-mirror 7.

For the half-mirror 7 a transparent thin board made of transparent plastic or glass or such, with thin reflective coating on one of its sides, might be used. In case of the imaging optical system 6 used for the floating image interaction device 1''' of the present embodiment, the half-mirror surface 7S that both reflects and transmits light, of the half-mirror board 7, serves as the refracting surface.

Figure 12:
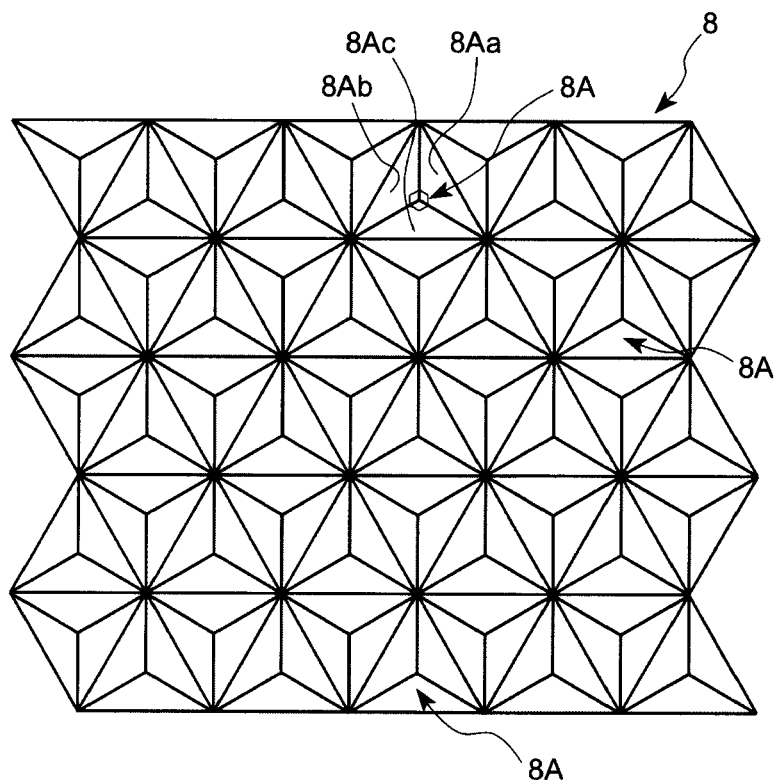
FIG. 12 is a drawing of one example of the retroreflector array used by the imaging optical system of the second embodiment of the present invention.
Figure 12:
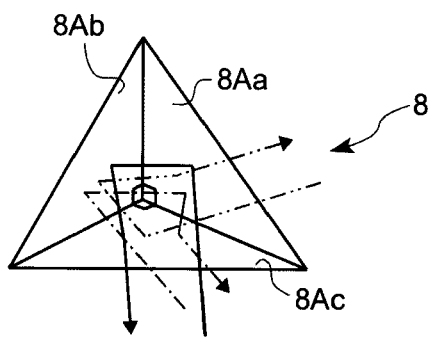
Figure 13:
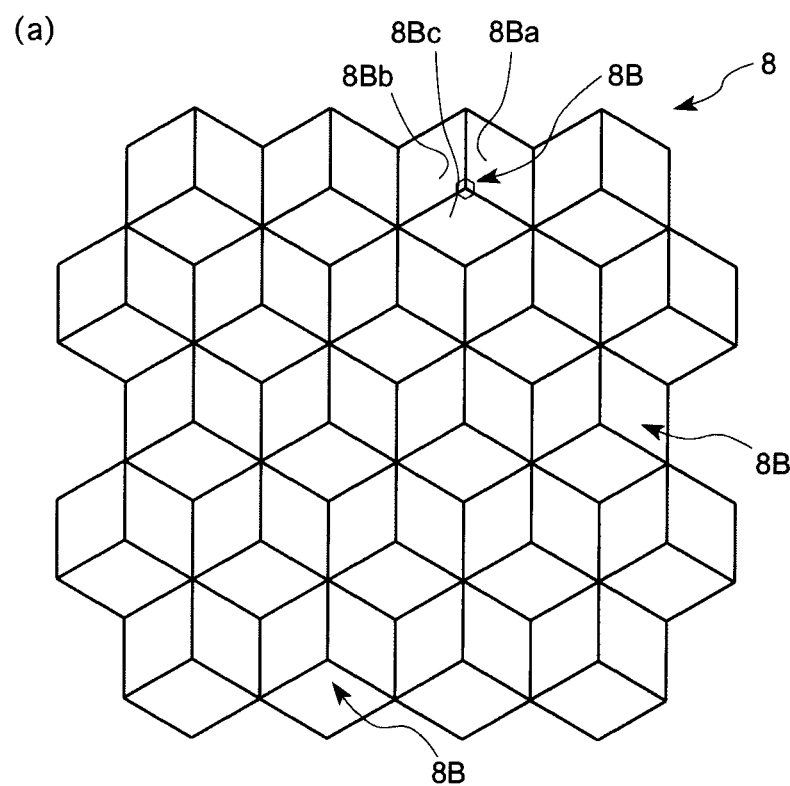
FIG. 13 is a drawing of one example of the retroreflector array used by the imaging optical system of the second embodiment of the present invention.
Figure 13:
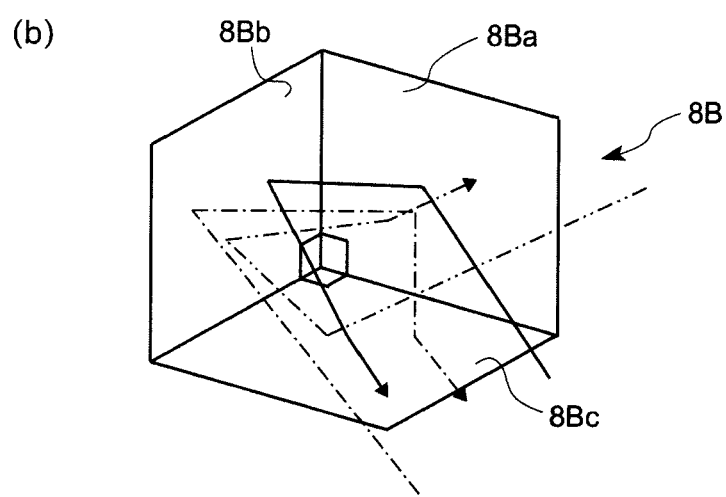

On the other hand, for the retroreflector array 8 any device might be used so far as they can precisely reflect back light in the reverse direction, thus for instance retroreflective coatings or retroreflective paints might be used on the surface of a board. Furthermore, in the present embodiment a flat device is used for the retroreflector array 8, but it is possible to use curved surfaces too. For instance, the retroreflector array 8, with a detail of the plane drawing shown enlarged in FIG. 12(*a*), is as a corner cube array, consisting of a set of corner cubes, made of shapes of one corner of a cube. Each retroreflector 8A consists of three specular surfaces 8Aa, 8Ab and 8Ac, of identically shaped isosceles right triangles of identical size, so that when one of their tips is connected together and viewed from the front, they form an equilateral triangle; and the three specular surfaces 8Aa, 8Ab and 8Ac are pairwise orthogonal and together form a corner cube. Furthermore, the retroreflector array 8 with its plane drawing shown enlarged in FIG. 13(*a*), is also a corner cube array, consisting of a set of corner cubes, made of shapes of one corner of a cube. Each retroreflector 8B consists of three specular surfaces 8Ba, 8Bb and 8Bc, of identically shaped squares of identical size, so that when one of their tips is connected together and viewed from the front, they form an equilateral hexangle, and the three specular surfaces 8Aa, 8Ab and 8Ac are pairwise orthogonal. The retroreflector array 8 differs only in shape from the retroreflector array 8 shown in FIG. 12(*a*) but its principle of recursive reflection is identical. Taking FIG. 12(*b*) and FIG. 13(*b*) as examples to explain the retroreflector array 8 shown in FIG. 12(*a*) and FIG. 13(*a*), as light arrives at one of the specular surfaces of the retroreflector 8A and 8B (for instance, at 8Aa and 8Ba), it will be reflected in sequence to another specular surface (8Ab and 8Bb), then again to still another specular surface (8Ac and 8Bc), thereby getting reflected back in the same direction from where it arrived. It should be noted that the arriving direction and the departing direction of light paths at the retroreflector array 8 are strictly speaking not overlapping but parallel; however, as far as the dimensions of the retroreflectors 8A and 8B are sufficiently small compared with the dimensions of the retroreflector array 8, for practical purposes the arriving and departing directions of the light paths could be deemed overlapping. The difference of the above-mentioned two types of corner cube arrays is that while the case of specular surfaces shaped like isosceles right triangles is slightly easier to manufacture, it has slightly weaker retroreflecting capability; on the other hand, with specular surfaces shaped like squares, it is slightly more difficult to manufacture, but it has somewhat higher retroreflecting capability.

Figure 14:
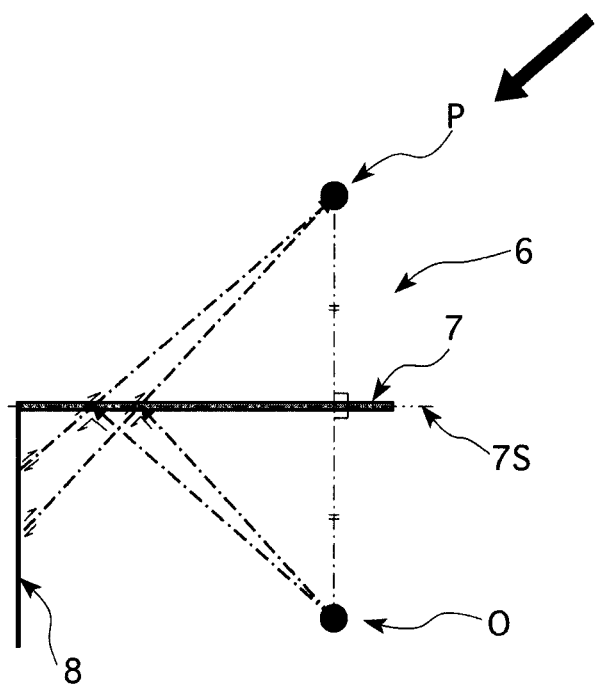
FIG. 14 is a side view drawing showing schematically the imaging process of the imaging optical system used by the second embodiment of the present invention.

In FIG. 14, the principle of image forming of the imaging optical system 6 used for the present embodiment is shown schematically by a side view of the reflection and transmission process of the light rays. The imaging optical system 6 has the half-mirror 7 arranged horizontally, whereas at one end of the half-mirror 7 (the end opposite to the observing direction) vertically underneath the half-mirror surface 7S, thus inside the enclosure 4, a retroreflector array 8 is placed in a vertical orientation, wherefore the half-mirror 7 and the retroreflector array 8 are at nearly perpendicular to each other. Firstly, light being emitted into all directions from the object to be projected O (in the drawing shown as a point light source) are going to be reflected from the half-mirror surface 7S of the half-mirror 7, then get reflected in the reverse direction from the retroreflector array 8, further on get transmitted through the half-mirror surface 7S, therefore passing through one point in the space above the half-mirror 7, thus being focused again into one point. Thus the above-mentioned focusing is interpreted as an imaging process. The above-mentioned focus point is at a planar symmetric location to the object to be projected O with respect to the half-mirror surface 7S. It should be noted that in the present embodiment the retroreflector array 8 is located inside the enclosure 4 in order to prevent interference with the observation of the real image P, but so far as it presents no interference to the observation of the real image P, the retroreflector array 8 might also be placed above the half-mirror 7, or it might placed overlapping both above and below the half-mirror 7. In case the retroreflector array 8 is located above the half-mirror 7, the light emitted to all directions from the object to be projected O will pass through the half-mirror 7 in a straight line and will be reflected back by the retroreflector array 8, then by being reflected by the half-mirror 7, it will form an image in a point in the space above the half-mirror 7. Furthermore, when the retroreflector array 8 is arranged overlappingly both above and below the half-mirror 7, the light emitted from the object to be projected O will follow both of the above-mentioned light paths, and together will form an image of the object to be projected O in a planar symmetric position with respect to the half-mirror surface 7S. In other words, light rays progressing along any of the above-mentioned paths will be passing through the point that is in a planar symmetric position to the object to be projected O with respect to the half-mirror 7 (more precisely, to the half-mirror surface 7S), thus the real image P will be jointly formed in the same position, and it will be observable from a given position. The brightness of the real image P relative to the object to be projected O (the aperture of the light rays) can be obtained as the product of the three values of the 'half-mirror aperture', the 'half-mirror reflectivity', and the 'corner cube reflectivity' along each light path. Assuming as an ideal case that the 'half-mirror aperture' and the 'half-mirror reflectivity' are both 0.5, and the 'corner cube reflectivity' is r, then the aperture for the real image P due to either one of the light paths will be 0.25r, and the total aperture for the case when both light paths L1 and L2 contribute to P will be 0.5r.

Figure 7:
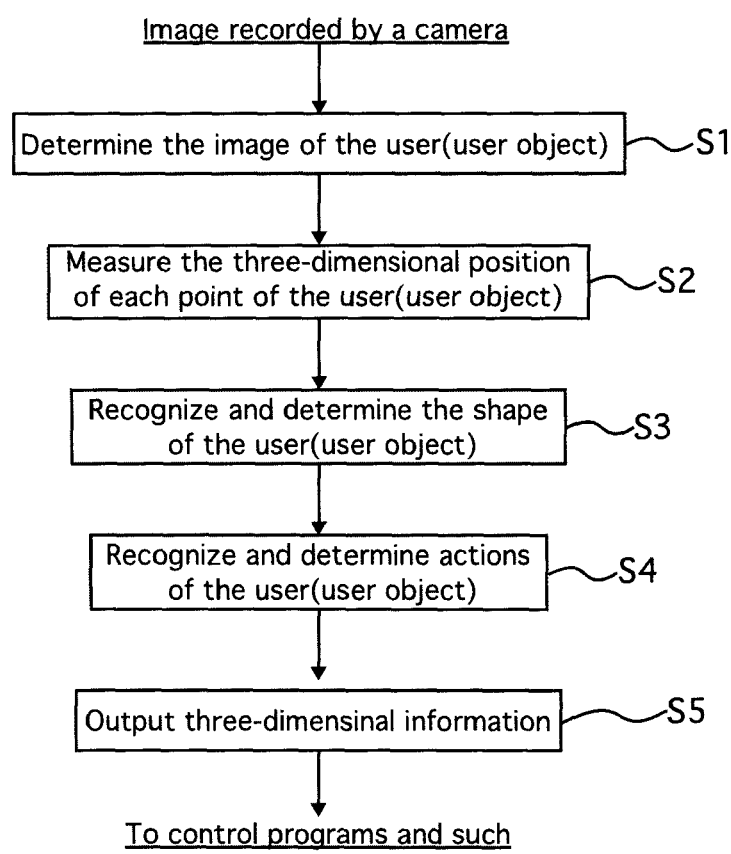
FIG. 7 is a flowchart showing one exemplary realization of the processing by the program used in the first embodiment of the present invention.

Accordingly, in case of the floating image interaction device 1''' of the present embodiment, by reflecting the light emitted from the object to be projected O in an oblique downwards angle by the half-mirror 7 of the imaging optical system 6, reflecting it back by the retroreflector array 8, then again passing it through the half-mirror 7 in a straight line, a real mirror image will be formed in a planar symmetric position relative to the half-mirror surface 7S that serves as a refracting surface, thus the real image P will be observable from an oblique upwards direction above the half-mirror 7. The three-dimensional position of the real image P, similarly to the case of the first embodiment, will be obtainable when the position of the half-mirror 7 and the position of the object to be projected O are known with respect to the enclosure 4, making use of the rule that the real image P always appears in a planar symmetric position to the object to be projected O with respect to the half-mirror surface 3S. Furthermore, it will be possible to observe the user (user object) U accessing the real image P directly by the two cameras 51 through the small holes 72 opened in the lid 71 of the enclosure 4. Information about the image recorded by the two cameras 51 will be fed to the image processing device 52, whereas based on the image information an image processing program and an user object recognition program of the image processing device 52 will determine the image of the user (user object) U and measure its three-dimensional position, the processing being similar to the case of the first embodiment as shown in the flowchart of FIG. 7. Furthermore, regarding the information about the three-dimensional position of the user (user object) U (or additionally, also the information about the three-dimensional position of the real image P), in the case if for instance an appropriate control program controls the object to be projected O that is for instance a physical object or a displayed image, the information might be fed to the control program, similarly to the explanation for the case of the first embodiment. Of course, if the object to be projected O is a displayed image, similarly it is possible for the control program to change the object to be projected O into another image.

As elaborated above, by using the floating image interaction device 1''' of the present embodiment in the above-mentioned manner, then similarly to the case of the first embodiment, inasmuch the real image P of the object to be projected O can be projected into the space above the half-mirror surface 7S either in a two-dimensional or a three-dimensional manner, the three-dimensional position of the user (user object) U accessing the real image P can readily be determined. Therefore, for instance by using the three-dimensional position information of the user (user object) U to be processed by the program controlling the movement of the object to be projected O, it becomes readily possible to move or modify the object to be projected O or its real image P according to the position of the user (user object) U, therefore the virtual interaction between the real image P and the user (user object) U is readily realized. Furthermore, inasmuch as with the floating image interaction device 1''' it is not necessary to affix any sensor device to the user (user object) U to determine its three-dimensional position, for instance even for a passing-by user wishing to use the floating image interaction device 1''', using it is possible without any hindrances. Furthermore, since it is not needed to place infrared sensor pairs around the floating image interaction device 1''' to determine the position of the user (user object) U, the floating image interaction device 1''' might be constructed in a compact size, making its installation or relocation easy.

It should be mentioned that the structure of the floating image interaction device 1''' having an imaging optical system 6 consisting of a half-mirror 7 and a retroreflector array 8 is not restricted to the above-mentioned realization. For instance, similarly to the case of the floating image interaction device 1 of the first embodiment, it is possible to locate the cameras 51 in a way as to observe the user (user object) U through the half-mirror 7; or similarly to the case of the floating image interaction device 1" that is a variant of the first embodiment, it is of course possible to locate the cameras 51 in the space above the half-mirror 7 so as to observe the user (user object) U directly. Furthermore, as mentioned already, it is possible to locate the retroreflector array 8 only above the half-mirror 7, or to locate it overlappingly both above and below the half-mirror 7.

Figure 15:
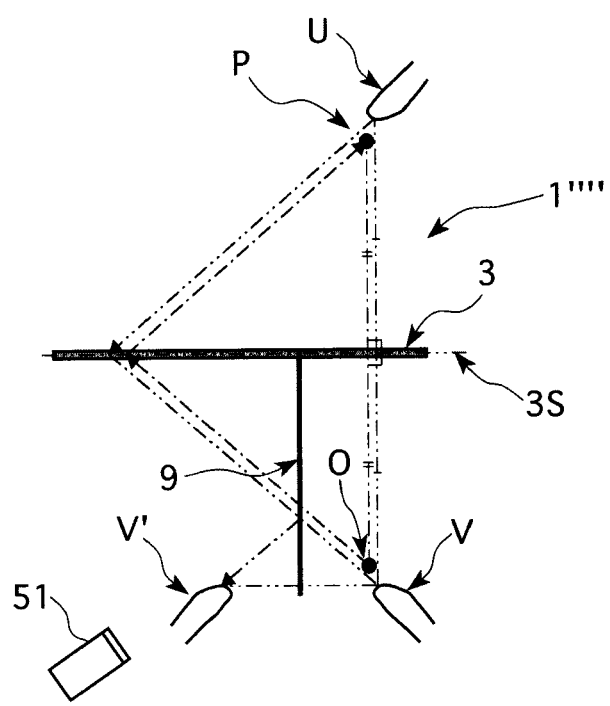
FIG. 15 is a side view drawing showing schematically an example of the process of recording the real image of the user using a half-mirror as used by another embodiment of the present invention.

Furthermore, in case of the present invention, it is possible not only to record by cameras the user (user object) and thus determine its position or shape, but also to use a configuration where a half-mirror is used to separate the real image of the user (user object) formed by the imaging optical system from the object to be projected, and thus to determine the position or shape of the user (user object). For instance FIG. 15 is a schematic drawing of the floating image interaction device 1'''' as another embodiment of the present invention, whereas a dihedral corner reflector array 3 is used as the imaging optical system similarly to the case of the first embodiment. As shown in the drawing, the light emitted by the object to be projected O is reflected twice by each dihedral corner reflector 2 of the dihedral corner reflector array 3, and passes through the optical device plane 3S while being refracted, thus forming a real image P at the opposite side of the optical device plane 3S at a planar symmetric position to the object to be projected O with respect to the optical device plane 3S. The above-mentioned imaging process of the dihedral corner reflector array 3 is symmetrical with respect to the optical device plane 3S. Therefore the light emitted by the user (user object) U approaching the real image P will also be reflected twice by each dihedral corner reflector 2 of the dihedral corner reflector array 3, thus forming a real image V at a planar symmetric position with respect to the optical device plane 3S. However, it must be noted that depending on the relative position of the user (user object) U and the real image P, the real image V might be occluded by the object to be projected O, and the imaging might be partial or might not happen at all. Therefore in the present example, a half-mirror 9 is placed between the optical device plane 3S and the object to be projected O; or more specifically, in a section of the light path originating in the user (user object) U and refracted at the optical device plane 3S, the section being between the refraction point and the real image V. In the example shown in the drawing, an arrangement is shown where the half-mirror 9 is nearly perpendicular to the optical device plane 3S; however, the angle of the half-mirror 9 with respect to the optical device plane 3S can be changed as desired. Inasmuch as the light from the object to be projected O passes in a straight line through the half-mirror 9, it does not interfere with the forming of the real image P. In that way, by the inclusion of the half-mirror 9, the light from the user (user object) U shall be transmitted through the optical device plane 3S while being reflected twice on each dihedral corner reflector 2 of the dihedral corner reflector array 3, and part of the transmitted light shall be reflected by the half-mirror 9, forming a real image V' of the real image V at a planar symmetric position with respect to the half-mirror 9. By recording the real image V' with cameras 51, it becomes possible to determine the position and shape of the user (user object). Furthermore, by adjusting the inclination of the half-mirror 9, it is possible to arrange it in a way so that when the real image V' is recorded with cameras 51, the object to be projected O will not overlap the real image in the background, thus the position and shape of the real image V' can be determined in a state when it is separated from the object to be projected O. Furthermore, in the current example a dihedral corner reflector array 3 was used as the imaging optical system, but it is equally feasible to use a half-mirror 7 and a retroreflector array 8 as the imaging optical system, or to use other equivalent imaging optical systems.

Furthermore, for the present invention the determination of the position of the user (user object) accessing the floating image can be realized not only by cameras, but other methods like position detection using laser scanners; position determination by sensing the link angles of a link mechanism; magnetic sensors; ultrasonic sensors; electromagnetic wave position sensors; or such.

Furthermore, when the three-dimensional relative position of the real image P and the user (user object) U is determined, for its feedback to the virtual interaction between the user (user object) U and the real image P, it is possible to equip the floating image interaction device with a real image modifying means capable of modifying the real image P. To realize the above real image modifying means, it is preferable to use a displayed image for the object to be projected O as mentioned above, and incorporate dynamic changes to the object to be projected O into the program controlling the displayed image. In concrete terms, for instance as a means for modifying the real image according to the position and shape of the user (user object) U, it is possible to measure the position of points on the user (user object) U and determine the three-dimensional position and shape of the user (user object) U from that; then perform shape recognition of the user (user object) U from that shape information; furthermore, perform action recognition from the recognized shape data; therefore classify actions of the user (user object) U such as grasping, pinching, or stroking the real image P. Thereupon it becomes possible to use the measured position information and the relative position with the real image, as well as the shape and action information, to perform appropriate modifications on the object to be projected O, in order to cause it to change, thereby realizing the interaction between the user (user object) U and the real image P.

Furthermore, as another means for realizing feedback by interaction, it is possible to incorporate into the floating image interaction device in addition to, or separately from the above-mentioned real image modifying means, an user object actuator means that is capable of exerting force on physical objects. As an example of an user object actuator means, for instance it is possible to use the above-mentioned link mechanism with its manipulator being held and pointed by the user, and in addition of using it for position sensing, also use it to exert force, causing reaction force to be exerted on the user's hand, therefore realizing the force feedback. In that case, insofar as the length of each segment of the link mechanism will be known, by using the angular information between the links up to the link held in the hand of the user while accessing the real image P, the coordinates of the end point of the link mechanism (thus of the user's hand) might be calculated. Furthermore, as another example of an user object actuator means, it is possible to apply an air jet generating device to direct airflow to the hand of the user. In that case, for instance in the vicinity of the refracting surface of the above-mentioned exemplary embodiments (for instance, in the lids 31 or 71) holes might be opened, and air nozzles might be installed for ejecting vortex rings or air jets in order to generate air flow; thereupon when information is obtained from the user object detecting means that the user's hand has accessed the real image, air flow might be generated, thereby causing haptic sensation for the user. It is preferable to use such air nozzles that are equipped with direction controllers (for the angles of the azimuth and elevation), capable of directing air flow at the user's hand as its position is detected, with the benefit that in this case, in contrast with the above-mentioned case when a link mechanism is used, there is no need for the user to be wearing any equipment. In addition, other possible user object actuator means include using force feedback by wires affixed to the user (user object) U while accessing the real image P; or haptic feedback by vibration motors affixed to the user (user object) U; or such.

Furthermore, we note that details of the components are not restricted to the examples shown in the exemplary embodiments above, but might be determined in many similar ways in accordance with the essence of the present invention.

Industrial Applicability

The floating image interaction device of the present invention is applicable as an imaging device allowing the interaction between floating images and users; or as an attractions equipment; or as an educational equipment; or as a medical equipment; or in such other fields.

I claim:

1. A floating image interaction device, comprising:
   distortion-free imaging optical system including a surface at which paths of light rays are bent by means of mirror surface reflection; and
   a user object detecting means,
   wherein for an object to be projected placed to one side of said surface, said imaging optical system forms a real image of said object on the opposite side of said surface with front and back being reversed,
   the imaging optical system is for forming a two-dimension real image of a two-dimension object to be projected, and a three-dimensional real image of a three-dimension object to be projected;
   the real image can be observed from oblique direction of the surface;
   and said user object detecting means capable of detecting the position, or the position and shape of user objects approaching said real image.

2. A floating image interaction device according to claim 1, further comprising:
   a real image modifying means wherein said position, or position and shape of said objects as detected by said user object detecting means is used to modify said real image.

3. A floating image interaction device according to claim 1, further comprising an object actuator means, wherein said position, or position and shape of said user objects as detected by said user object detecting means is used to exert force on said user object.

4. A floating image interaction device according to claim 3, wherein said object actuator means mechanically exert force.

5. A floating image interaction device according to claim 3, wherein said object actuator means generates an air flow.

6. A floating image interaction device according to claim 1, wherein said imaging optical system is realized by an imaging optical device comprising a plurality of unit optical elements, said unit optical elements comprising of at least one specular surface reflecting light and arranged perpendicularly or nearly perpendicularly to an optical device plane corresponding to said surface, whereas for an object to be projected placed to one side of said optical device plane, its real image will be formed on the opposite side of said optical device plane by said plurality of unit optical elements.

7. A floating image interaction device according to claim 6, wherein said imaging optical device comprises a plurality of unit optical elements realized by dihedral corner reflectors consisting of pairs of mutually perpendicular specular surfaces, thereby functioning as a dihedral corner reflector array.

8. A floating image interaction device according to claim 1, wherein said imaging optical system comprises a half-mirror having a half-mirror surface corresponding to said surface, and a retroreflector array comprising of a set of unit retroreflectors, whereas said retroreflectors are located so as to recursively reflect light reflected by, or transmitted through, said half-mirror.

9. A floating image interaction device according to claim 1, wherein said user object detecting means is located in a fixed position with respect to said surface.

10. A floating image interaction device according to claim 1, wherein said user object detecting means comprises at least one camera, and an image processing device capable of determining the position, or the position and shape of said object from images recorded by said camera.

11. A floating image interaction device according to claim 10, wherein said camera is located on the same side of said surface as said object to be projected.

12. A floating image interaction device according to claim 11, wherein said camera is located in such a position so that it can observe said object to be projected directly through said surface.

13. A floating image interaction device according to claim 11, wherein a half-mirror is placed between said surface and said object to be projected, and furthermore said camera is located in such a position so that it can observe the real image of said object to be projected as formed by said imaging optical system, and reflected by said half-mirror.

14. A floating image interaction device according to claim 6, wherein said user object detecting means comprises at least one camera, and an image processing device capable of determining the position, or the position and shape of said user object from images recorded by said camera, and said camera is located in such a position so that it can observe light emitted from said user object and reflected only once by said unit optical elements.

15. A floating image interaction device according to claim 10, wherein said camera is located in such a position so that it can observe directly said user object without the light passing through said surface.

16. A floating image interaction device according to claim 10, wherein said camera is located on the same side of said surface as said real image.

17. A floating image interaction device according to claim 10, wherein at least one of said cameras is a distance detecting camera.

18. A non-transitory computer readable medium storing computer program to be used by the floating image interaction device according to claim 1, comprising:
   a user object detection procedure; and
   a user object information generating procedure,
   wherein said user object detection procedure detects an information of the position, or position and shape of said user object by using said user object detecting means, and determines the position or the position and shape of said user object based on said detected information,
   and wherein said user object information generating procedure receives said information from said user object detection procedure about the position, or the position and shape of said user object, and generates information for an appropriate interaction program in order to control said object to be
   projected according to the position or the position and shape of said user object.

19. A floating image interaction device according to claim 7, wherein each of the dihedral corner reflectors is provided by an inner surface of a hole penetrating the distortion-free imaging optical system, wherein the mirror surface reflection occurs at the dihedral corner reflectors when the light rays pass through the hole.

20. A floating image interaction device, comprising:
   a substrate including a plurality of dihedral corner reflectors, the substrate transmitting light rays therethrough in a distortion-free manner such that the light rays are bent by the dihedral corner reflectors by means of mirror surface reflection, the substrate having a first surface and a second surface, wherein when an object to be projected is placed at a side of the first surface, an real image is formed reversely at a side of the second surface; and
   a user object detecting means for detecting position or shape of the object.

* * * * *